Patented Dec. 28, 1926.

1,612,670

UNITED STATES PATENT OFFICE.

FERNANDO SOMOZA VIVAS, OF LOS ANGELES, CALIFORNIA.

WATERPROOF TEREDO-REPELLING PAINT.

No Drawing. Application filed June 14, 1923, Serial No. 645,340. Renewed May 26, 1926.

The invention relates to a paint which will protect the material to which it is applied from the attacks of teredo, and which will at the same time be waterproof. An object of the invention is the provision of a waterproof paint which will withstand the action of sea-water, and which will repel teredo, and which, at the same time, will be inexpensive to produce.

The formula which is at present preferred as a physical embodiment of the invention comprises the following ingredients in the proportions named:

| | Parts. |
|---|---|
| Sardine oil | 450 |
| Fireproof drying oil | 80 |
| Rosin | 150 |
| Powdered sea shells | 220 |
| Zinc oxide | 100 |

Other fish oils may be substituted for the sardine oil named, and other pigments for the zinc oxide, without departing from the spirit of the invention.

It has been found by observation that the teredo does not attack shells, and also that fish oil is a repellent for the same. I have therefore, in the above formula, specified a considerable proportion of both of these substances, one to replace some of the usual paint oil, and the other to take the place of some of the usual pigment found in paints. It is found moreover that the paint prepared as specified is fire-resistant to a considerable extent.

The fireproof drying oil named in the above formula may be the oil which is described in my co-pending application for patent, Serial No. 645,342, filed June 14, 1923, and having a preferred formula as follows:

| | Parts. |
|---|---|
| Drying oil | 60 |
| Borax | 10 |
| Potash alum | 10 |
| Ammonium chloride | 10 |
| Boric acid | 5 |
| Tungstate of sodium | 5 |

Minor changes may be made in the named proportion of parts and known equivalents may be substituted for some of the ingredients named without departing from the spirit of the invention.

I claim:

1. A waterproof teredo repellent paint comprising in combination, fish oil, fireproof drying oil, rosin and powdered sea shells, in proportions to provide a water-proof teredo repelling paint.

2. A waterproof teredo repellent paint comprising in combination, fish oil, fireproof drying oil, rosin, powdered sea shells and a pigment, in proportions to provide a waterproof teredo repelling paint.

3. A waterproof teredo repellent paint comprising in combination, sardine oil, fireproof drying oil, rosin, powdered sea shells and zinc oxide, in proportions to provide a waterproof teredo repelling paint.

4. A waterproof teredo repellent paint comprising in combination, sardine oil 450 parts, fireproof drying oil 80 parts, rosin 150 parts, powdered sea shells 220 parts, and zinc oxide 100 parts.

FERNANDO SOMOZA VIVAS.